United States Patent [19]
Larkin

[11] 3,975,959
[45] Aug. 24, 1976

[54] PRESSURE GAUGE

[76] Inventor: Sam Larkin, 254 Beach 140th St., Belle Harbor, N.Y. 11691

[22] Filed: Feb. 28, 1975

[21] Appl. No.: 553,882

[52] U.S. Cl. .............................. 73/419; 116/129 H
[51] Int. Cl.² ............................................ G01L 7/16
[58] Field of Search ............... 73/406, 407 R, 419, 73/146.8, 146.3, 146.2, 146.4, 410, 392; 116/129 H

[56] References Cited
UNITED STATES PATENTS

| | | | |
|---|---|---|---|
| 2,329,039 | 9/1943 | Fenwick | 73/146.8 |
| 3,177,724 | 4/1965 | Trinca | 73/146.8 |
| 3,523,451 | 8/1970 | Kohn | 73/406 |

FOREIGN PATENTS OR APPLICATIONS

| | | | |
|---|---|---|---|
| 288,472 | 5/1953 | Switzerland | 73/419 |
| 215,477 | 5/1924 | United Kingdom | 73/419 |

*Primary Examiner*—Donald O. Woodiel
*Attorney, Agent, or Firm*—Friedman & Goodman

[57] ABSTRACT

A gauge for measuring fluid pressure having a housing containing a dial plate provided with pressure readings thereon, and a pointer to indicate the pressure readings. The pointer is rotated by a cylindrical member connected thereto. The cylindrical member is associated with a plunger against which the fluid pressure is exerted. A coil spring exerts a spring pressure on the plunger for determining movement of the plunger in a linear direction to any one of predetermined positions corresponding to associated fluid pressures. The spring characteristic causes the predetermined positions to be non-proportional to the associated fluid pressures. The plunger is provided with at least one guide groove corresponding to the spring characteristic for relating non-proportional linear positions to radial positions which are proportional to the associated fluid pressures. The cylindrical member is provided with follower projections which are engaged in the guide grooves for rotating the cylindrical member with respect to the radial positions as the plunger is moved in the linear direction so that the pointer is rotated to one of the pressure readings corresponding to the fluid pressure acting against the plunger.

6 Claims, 4 Drawing Figures

PRESSURE GAUGE

BACKGROUND OF THE INVENTION

The present invention relates to a pressure gauge, and more particularly to a guage for measuring air pressure such as in an automobile pneumatic tire.

The piston-type pressure gauge is well known in the art, being a so-called dead weight apparatus in which the pressure to be measured is balanced by adjustment of a weight placed on the piston. Usually, the pressure readings are marked on the piston, and are read as the piston is moved out of its housing when the pressure is applied thereto. This is a very accurate type of gauge, employed for the calibration and testing of other gauges. However, the piston after non-use tends to stick within its housing, where care must be taken not to damage the piston which is usually always exposed.

Another important and widely used instrument is the Bourdon-tube pressure gauge, or spring-tube pressure gauge, in which pressure measurement is based on the deformation of an elastic measure element, such as a curved tube, by the pressure to be measured. The deformation is indicated by a pointer on a dial calibrated to give pressure readings. The tube which is of circular or oval cross-sectional shape, is closed at one end, and the pressure to be measured is applied to the other end, causing the radius or curvature of the tube to increase, i.e., the tube tends to straighten itself out.

In a diaphragm-pressure gauge, an elastic element is a stiff metallic diaphragm held between two flanges, the pressure is equal to the underside of the diaphragm, and movement of the latter is transmitted to a pointer. However, in both the Bourdon-tube and the diaphragm pressure gauge, a linkage must be used to connect the elastic element to the pointer. This linkage usually consists of a rack and pinion mechanism which is expensive to manufacture, and tends to be easily damaged if improperly handled. Additionally, the size of the pressure gauge must be increased to accommodate such a rack and pinion mechanism.

SUMMARY OF THE INVENTION

This invention relates to a gauge for measuring fluid pressure comprising a dial plate provided with pressure readings thereon, a pointer to indicate the pressure readings, a cylinder connected to the pointer for rotating the pointer to a proper one of the readings, a plunger having one end extending into the cylinder for association therewith where the fluid pressure is exerted on the opposite surface of the plunger, spring means exerting a pressure on the plunger for determining the movement of the plunger relative to the fluid pressure, the spring characteristic causing the plunger to move non-proportional to the relative fluid pressures, the plunger being provided with guide means corresponding to the spring characteristic for relating the non-proportional movement to radial positions which are proportional to the associated fluid pressures, and the cylinder member being provided with follower means engaged in the guide means for rotating the cylinder member with respect to the radial positions as the plunger moves in a linear direction so that the pointer is rotated to one of the pressure readings corresponding to the fluid pressure acting against the plunger.

Accordingly, an object of the present invention is to provide a pressure gauge which overcomes the disadvantages of the prior art.

Another object of the present invention is to provide a pressure gauge having a dial provided with pressure readings thereon which can easily be read when indicated by a rotating pointer.

A further object of this invention is to provide a pressure gauge which overcomes the non-proportional characteristic of its spring, where a piston is provided with a groove corresponding to the spring characteristic for rotating the pointer of the gauge.

A still further object of the present invention is to provide a pressure gauge that is simple and inexpensive to manufacture, one which has few parts and cannot easily be broken.

An added object of the invention is to provide a pressure gauge that can be made relatively small, and yet indicate pressure readings on a dial.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
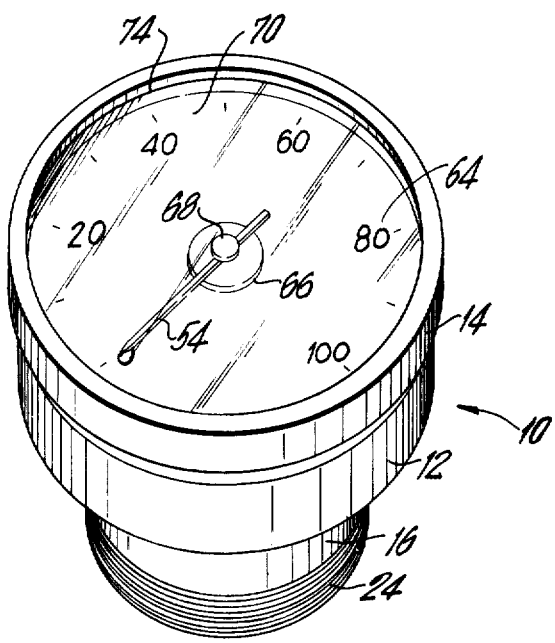
FIG. 1 represents a perspective view of a pressure gauge pursuant to the present invention.

Referring to the drawings, FIG. 1 illustrates a pressure gauge 10 of the present invention. The gauge 10 includes a case member 12 provided with a cover member 14 and a housing member 16. The essential components of the present invention are disposed in the housing member 16, as will be described hereinafter below in more detail.

Figure 2:
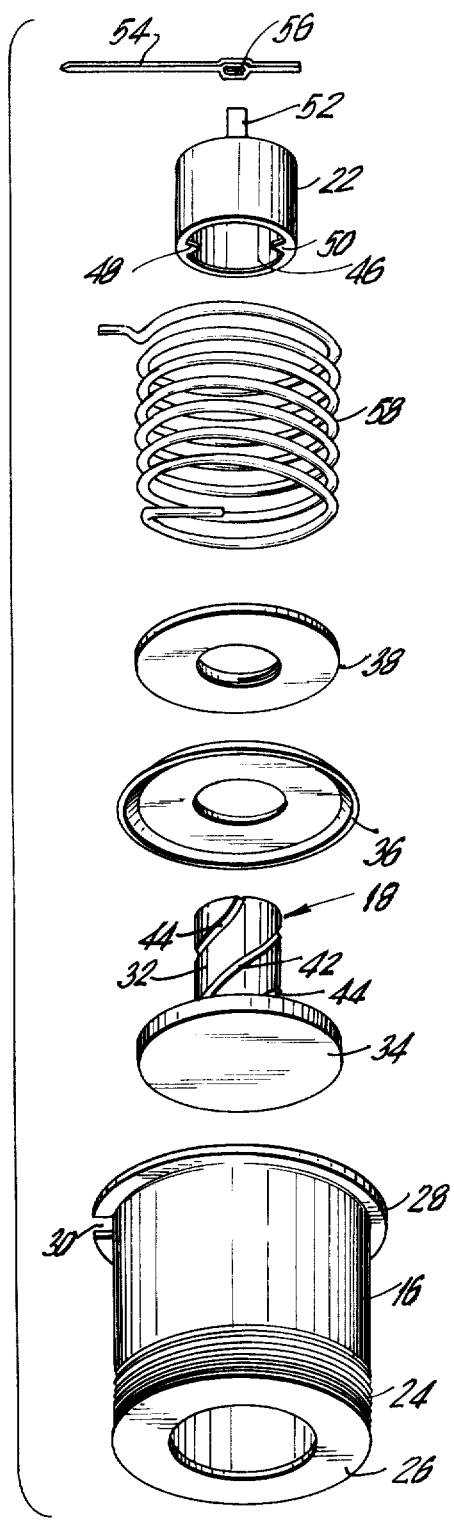
FIG. 2 represents an exploded perspective view of the internal elements of the pressure gauge.

A piston, plunger or rod 18 and a cylindrical follower member 22, shown in FIG. 2, are disposed within the housing member 16. The housing member 16 is cylindrical and hollow, having an externally threaded end portion 24 provided with an in turned flange or rim 26. Preferably, the opposite end of the housing member 16 is provided with an out-turned flange or lip 28. A slotted opening 30 extends through the flange 28 into a top portion of the housing member 16.

The plunger 18 includes a cylindrical stem portion 32 and an enlarged circular head portion 34. The plunger 18 is provided with a cup-shaped member 36 fabricated from plastic, rubber or the like. The cup-shaped member 36 has an outer rim extending outwardly from its planar body, and a centrally located opening or hole in the planar body to permit the cup-shaped member to pass over the stem portion 32 for abutment against the head portion 34. A threaded washer 38 secures the cup-shaped member 36 against the head portion 34, the inner end of the stem portion 32 being threaded to secure the washer 38 thereon. The planar body portion of the cup-shaped member 36 and the washer 38 are approximately the same circular size as the head portion 34, as will be set forth hereinafter below.

The stem portion 32 is provided with two guide grooves 42 and 44 disposed in the outer surface thereof. The guide grooves 42, 44 are symmetrical with respect to each other about the longitudinal axis of the stem, where a cross section taken transversely through the stem would show that the grooves are 180° apart. The grooves 42, 44 extend directly from one end of the stem to the opposite end thereof in one revolution or turn of each groove, being spaced from the above-mentioned inner threaded portion of the stem. As shown in the drawings, the pitch or degree of slope of the grooves around the stem varies or changes relative to the longitudinal distance along the stem.

The cylindrical follower 22 is hollow, having an opening 46 therein. A pair of pointed tabs or projection 48 and 50 are disposed 180° apart, and project into the opening 46. The opposite end of the cylindrical follower 22 is closed, and has a pin-like member 52 extending outwardly from a central portion thereof so as to be in alignment with the axis of the follower 22. Preferably, the pin-like member 52 is non-circular in cross section, preferably having a rectangular cross section, to receive a pointer or indicating needle 54 thereon through the non-circular opening 56 provided in the pointer 54. A coil spring 58 is disposed around the cylindrical follower 22 and the plunger 18 for exerting pressure on the head portion 34 of the plunger 18, as will be discussed hereinafter below.

Figure 3:
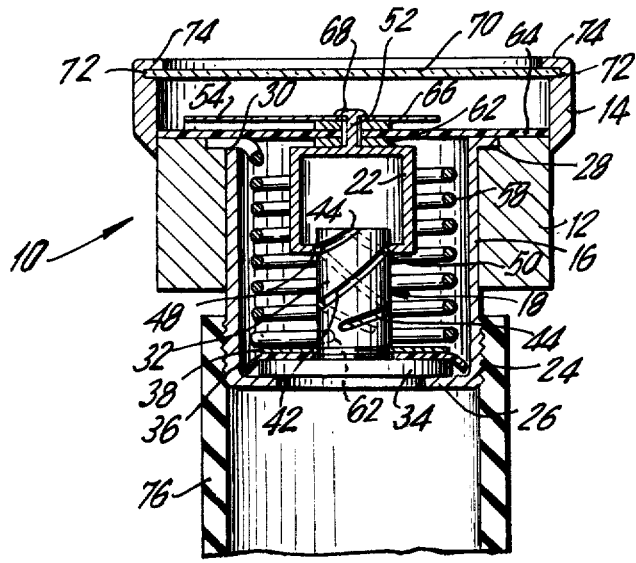
FIG. 3 represents a side sectional view of the pressure gauge shown in FIG. 1.

To assemble the gauge 10, shown in cross section in FIG. 3, the housing member 16 is placed into the case member 12 with the threaded end portion 24 extending outwardly thereof, and the flange 28 abutting against a top portion of the case member 12, preferably being seated within a groove provided therefor. Preferably, the housing member 16 is secured to the case member 12 by any suitable means well known in the art, such as a force-fit therebetween, welding and the like, to provide an integral unit. It is understood, that the housing member and the case member 12 if desired could be formed in a one-piece construction.

The plunger unit is assembled by passing the stem portion 32 through the opening in the cup-shaped member 36, and positioning the planar body of the cup-shaped member against the head portion 34 so that the outer rim of the cup-shaped member 36 extends outwardly around the outer peripheral edge of the head portion 34, as shown in FIG. 3. The stem portion 32 is now passed through the threaded opening in the washer 38. The washer 38 is threaded onto the threaded portion of the stem until it abuts against the planar body of the cup-shaped member 36, thereby securing the cup-shaped member in position.

The coil spring 58 is positioned around the plunger unit. Preferably, an end of the coil spring 58 is inserted into an opening or slot 62 provided in the stem portion 32 to connect the spring 58 to the plunger 18. Additionally, the end of the spring 58 can be secured in the opening 62 by any suitable means, such as soldering. The plunger unit with the spring 58 connected thereto is now placed into the housing member 16, with the planar surface of the head portion 34 being positioned against the housing flange 26. Preferably, the other end of the spring 58 is inserted into the housing opening 30. Preferably, the other spring end can be secured in the opening 30 by any suitable means, such as soldering, the purpose of which will be discussed hereinafter below.

Preferably, a bearing washer 62, having a centrally located opening, is placed on the pin-like member 52 against the closed end of the follower 22. A dial plate 64, having a centrally located opening, is also placed on the pin-like member 52 against the washer 62. The face of the dial plate 64 is provided with equally spaced pressure readings disposed around the face, as best shown in FIG. 1. The dial plate 64 is preferably fabricated from a hard plastic, but may be constructed from a thin sheet metal or the like. A second bearing washer 66, having a centrally located opening, is placed on the pin-like member 52 against the face of the dial plate 64. The pin-like member 52 is now passed through the opening 56 in the pointer 54, with the pointer 54 being positioned against the washer 66. The end of the pin-like member 52 is now flattened by conventional means to provide a head portion 68 thereon, to rotatably secure the above-mentioned members to the follower 22.

The follower unit is now placed into the housing member 16 so that the top portion of the plunger stem 32 extends through the follower opening 46 and the pointed tabs 48, 50 are engaged in the plunger grooves 44, 42 respectfully. The underside of the dial plate 64 is disposed against the top surface of the case member 12, so that the hollow body member of the follower 22 lies completely within the housing member 16. Preferably, the dial plate 64 is secured to the case member 12 by any suitable means, such as glue, cement, rivets and the like. However, before the dial plate is secured, the dial plate 64 is adjusted with respect to the pointer 54 so that the pointer registers a zero pressure reading.

The cover member 14 can now be secured to the case member 12, by any suitable means, such as a force-fit, welding, fastening means and the like. The cover member 14 includes a transparent cover 70, fabricated from any suitable material such as glass, plastic or the like, which permits the pressure readings on the dial plate 64 to be easily read. The cover 70 is secured to the cover member 14 in any conventional means, such as being disposed in a circular groove 72, with an in-turned flange or rim 74 disposed about the periphery of the cover 70. It is understood, that the cover member 14 could be fabricated together with the case member 12 as an integral, one-piece unit, where the flange 74 would then be bent or turned down after the cover 70 has been inserted into the groove 72.

A conventional air hose 76, preferably formed from rubber, plastic or the like, is attached to the threaded end portion 24 of the housing member 16 so that the air pressure within the hose 76 can be measured. The threaded portion 24 makes an air tight connection between the hose 76 and the housing member 16. The air is forced through the opening in the bottom of the housing 16 defined by the flange 26, and is forced against the planar bottom of the head portion 34. Additionally, the air that is forced around the outer periphery of the head portion 34, acts upon the overhanging rim of the cup-shaped member 36, forcing this rim upwardly against the inner sidewalls of the housing 16 to provide an air tight engagement therebetween so that air can not pass into the upper portions of the housing member 16 and is only directed against the enlarged head portion 34.

Accordingly, the head portion 34 is forced upwardly into the housing member 16. The spring 58 secured to the plunger 18 prevents the plunger 18 from rotating, so that the plunger 18 can only have a linear displacement. Additionally, due to the securement of the spring 58 in the opening 30, there is no direct pressure brought against the dial plate 64, so that the strength of the dial plate 64 is not a major factor. However, it is understood, that if desired spring 58 could rest against the dial plate 64, such modification would not affect the function of the present invention.

Though two sets of grooves and pointed tabs are shown, the present invention would function if only one set of a groove and an associated tab was used. However, the two sets provide more balance and stability to the rotating follower 22.

As the plunger 18 is forced upwardly, the pointed tabs 48, 50 ride in their respective grooves 44, 42 so that the tabs 48, 50 are forced to rotate around the plunger stem 32, thereby rotating the follower 22 and the pointer 54 connected therewith. Accordingly, the plunger 18 will rise or be displaced upwardly until the spring pressure is equal to or balances the air pressure acting upon the plunger 18. During this linear displacement of the piston, the follower 22 has rotated so that the air pressure is indicated by the position of the pointer 54 on the dial plate 64.

It is noted, that the spring characteristic is such to cause the linear displacement of the piston or plunger 18 to be non-proportional to the applied fluid pressure. Thus, as the fluid pressure increases each increment of linear displacement decreases. That is to say, that 10 pounds of pressure added on to an initial 20 pounds of pressure would cause the plunger 18 to move a greater linear distance than the same 10 pounds of pressure added on to an initial 60 pounds of pressure. This is clearly shown in FIG. 4, where the vertical axis indicating the linear displacement of the piston, shows a greater displacement between 0 and 20 pounds of pressure than between 20 and 40 pounds of pressure. Also, the linear displacement between 20 pounds of pressure and 40 pounds of pressure is greater than the linear displacement between 40 pounds of pressure and 60 pounds of pressure, and so on. Accordingly, the grooves 42, 44 in the plunger stem 32 are calibrated to relate these non-proportional linear displacements to radial positions which are proportional to the associated fluid pressures.

Figure 4:
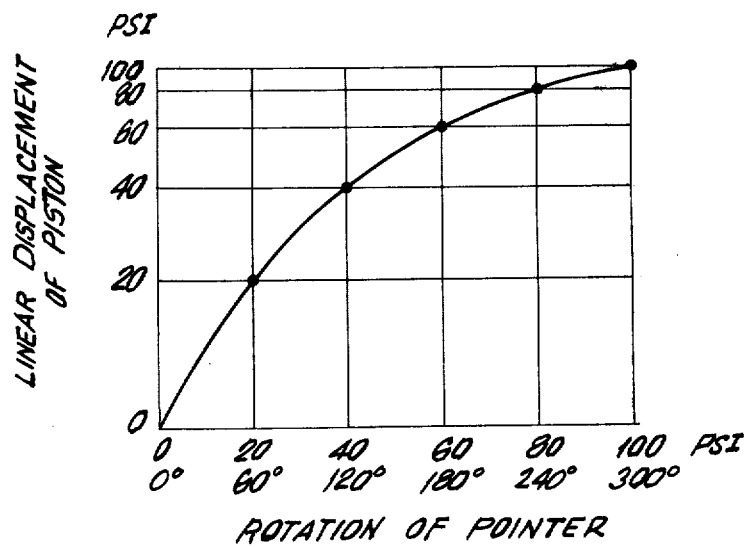
FIG. 4 is a graphical representation indicating the linear displacement of the piston relative to the rotation of the pointer.

In view of the above, FIG. 4 shows the relationship between the linear displacement of the piston and the rotation of the pointer. The horizontal axis relating to the rotation of the pointer is equally divided between 0° and 300° relative to the readings on the dial plate 64. Accordingly, the readings of zero to one hundred pounds of pressure are also equally divided in a proportional relationship to the above-mentioned 300° of the dial plate 64. By plotting the points, the curve shown in FIG. 4 was obtained. This curve, corresponding to the spring characteristic, was used to determine the grooves 42, 44. The zero pounds of pressure relates to the groove at the top free end portion of the stem 32, where the hundred pounds of pressure relates to the groove at the bottom of the stem 32 near to the head portion 34. Thus, it is seen, that the pitch or degree of slope is greater at the free end of the stem relating to the lower pounds of pressure, taken with respect to the longitudinal axis of the stem, than the pitch or slope taken near the head portion 34, which is relative to the higher pounds of pressure, where this latter slope tends to straighten out.

It is further noted, that the structures of the plunger 18 and follower 22 can be reversed. In this latter situation, the plunger would be a hollow cylinder having the pointed projections thereon, and the follower would be a cylindrical member disposed in the plunger and having the guide grooves therein. Accordingly, as the hollow plunger goes up and down, the pointed projections thereon would ride in the grooves of the follower and cause the follower to rotate in a similar manner as mentioned above to move the pointer to its corresponding pressure reading.

It is further noted, that once the pressure is released from the plunger head 34, the spring 58 will force the plunger back to its original position against the flange 26. Additionally, the rim of the cup-shaped member 36 would no longer be extended against the sidewalls of the housing member 16, so that the plunger would more freely return to its original position.

Numerous alterations of the structure herein disclosed will suggest themselves to those skilled in the art. However, it is to be understood that the present disclosure relates to a preferred embodiment of the present invention which is for purposes of illustration only and is not to be construed as limitations of the invention.

What is claimed is:

1. A gauge for measuring fluid pressure, said gauge comprising a dial plate provided with equally spaced pressure readings disposed around a face of said dial plate, a pointer to indicate said pressure readings, a rotatable member connected to said pointer for rotating said pointer above said face to a proper one of said readings, a plunger movable in a linear path in a direction of its axis, said plunger including a surface against which said fluid pressure is exerted, spring means exerting a spring pressure on said plunger which is in an opposite direction to said fluid pressure for determining movement of said plunger in said linear path to any one of predetermined positions corresponding to associated fluid pressures, said spring means having a spring characteristic which causes said predetermined positions to be non-proportional to said associated fluid pressures, one of said rotatable member and said plunger being provided with guide means corresponding to said spring characteristic for relating said non-proportional predetermined positions to radial positions which are proportional to said associated fluid pressures, and the other of said rotatable member and said plunger being provided with follower means engaging said guide means for rotating said rotatable member about said plunger axis with respect to said radial positions as said plunger moves in said linear path so that said pointer is rotated to one of said pressure readings corresponding to said fluid pressure acting against said plunger, said guide means including at least one groove, said follower means including at least one tab member engaging in said groove, said groove having varying degrees of slope with respect to said axis of said plunger, a degree of slope at one end of said guide means being greater than a degree of slope at an opposite end of said guide means to correspond to said spring characteristic.

2. A gauge as claimed in claim 1, wherein said groove is in said plunger, said groove extending longitudinally and around said plunger, said tab member being disposed on said rotatable member.

3. A gauge as claimed in claim 2, wherein said rotatable member includes a hollow cylindrical body, said plunger including a cylindrical stem portion and an enlarged head portion, said stem portion extending into said hollow body, said groove being disposed on said stem portion, and said tab extending into hollow area of said hollow body for engagement in said groove.

4. A gauge as claimed in claim 1, wherein said plunger, said rotatable member and said spring means are disposed in a hollow housing member, one end of said housing member being closed by said dial plate, said plunger being disposed adjacent to an opposite end of said housing member with said plunger surface facing an opening in said opposite end, and flange means provided on said opposite end for securing said plunger within said housing member.

5. A gauge for measuring fluid pressure, said gauge comprising a dial plate provided with pressure readings, a pointer to indicate said pressure readings, a hollow cylindrical member connected to said pointer for rotating said pointer to a proper one for said readings, a plunger movable in a linear path in a direction of its axis, said plunger including a cylindrical stem portion and a planar surface at one end against which said fluid pressure is exerted, spring means exerting a spring pressure on said plunger for balancing said fluid pressure, said spring means having a non-proportional spring characteristic, rotating means associated with said plunger and said cylindrical member for rotating said cylindrical member as said plunger moves in said linear path so that said pointer is rotated to one of said pressure readings corresponding to said fluid pressure acting against said plunger, said rotating means including at least one groove in said plunger stem portion and at least one tab member disposed on said cylindrical member, said tab member being engaged in said groove, said groove extending longitudinally and around said plunger stem portion, said groove having varying degrees of slope with respect to said axis of said plunger to correspond to said spring characteristic of said spring means, a degree of slope at said one end of said plunger being less than a degree of slope at an opposite free end of said plunger, said opposite free end of said plunger being disposed in said cylindrical member.

6. A gauge as claimed in claim 5, wherein said plunger, said cylindrical member and said spring means are disposed in a hollow housing member, said plunger being provided with cup-shaped means for providing a fluid-tight engagement with inner sidewalls of said housing member when said fluid pressure is exerted against said plunger planar surface.

* * * * *